United States Patent [19]

Lamoureux et al.

[11] 4,097,856

[45] Jun. 27, 1978

[54] GAS PANEL SINGLE ENDED DRIVE SYSTEMS

[75] Inventors: William Roger Lamoureux, Kingston; James Bryce Trushell, Saugerties, both of N.Y.

[73] Assignee: International Business Machines Corporation, Armonk, N.Y.

[21] Appl. No.: 729,056

[22] Filed: Oct. 4, 1976

[51] Int. Cl.[2] .......... G06F 3/14

[52] U.S. Cl. .......... 340/324 M; 315/169 TV; 340/343

[58] Field of Search .......... 315/169 R, 169 TV; 340/343, 324 M, 173 PL

[56] References Cited

U.S. PATENT DOCUMENTS

| | | | |
|---|---|---|---|
| 3,911,421 | 10/1975 | Alt et al. | 340/324 M |
| 3,919,591 | 11/1975 | Criscimagna | 340/324 M |
| 3,969,715 | 7/1976 | Lamoureux | 340/324 M |

*Primary Examiner*—Marshall M. Curtis

*Attorney, Agent, or Firm*—Joseph J. Connerton

[57] ABSTRACT

A system for addressing and controlling a gaseous discharge display or memory device is adapted for intercommunication between a processor or controller and a gaseous discharge display device. Signals of write amplitude are selectively applied to ionize individual cells or a plurality of cells in the form of character slices or lines to form the elements of a display. To facilitate communication between low level control logic signals and high level write and sustain signals, one of the axes or sets of conductors is maintained at ground potential, while signals of full write or sustain amplitude are applied to the orthogonal conductors. Writing is generally accomplished by adding a write pulse to the trailing edge of the selected conductor. By maintaining the busier axis at ground potential direct communication between the control logic and drive circuitry is provided, the isolation circuits required to communicate between the busy axis and the controller or processor are eliminated, the separate sustain drivers normally required to sustain the busy axis are eliminated and only a single set of drivers and isolation circuitry is required to interconnect the control logic to the drive selection circuitry. By operating in this mode, the sustain signal is not interrupted during a write operation thereby permitting use of the inherent margin in the panel and providing a display of uniform intensity.

7 Claims, 5 Drawing Figures

FIG. 2
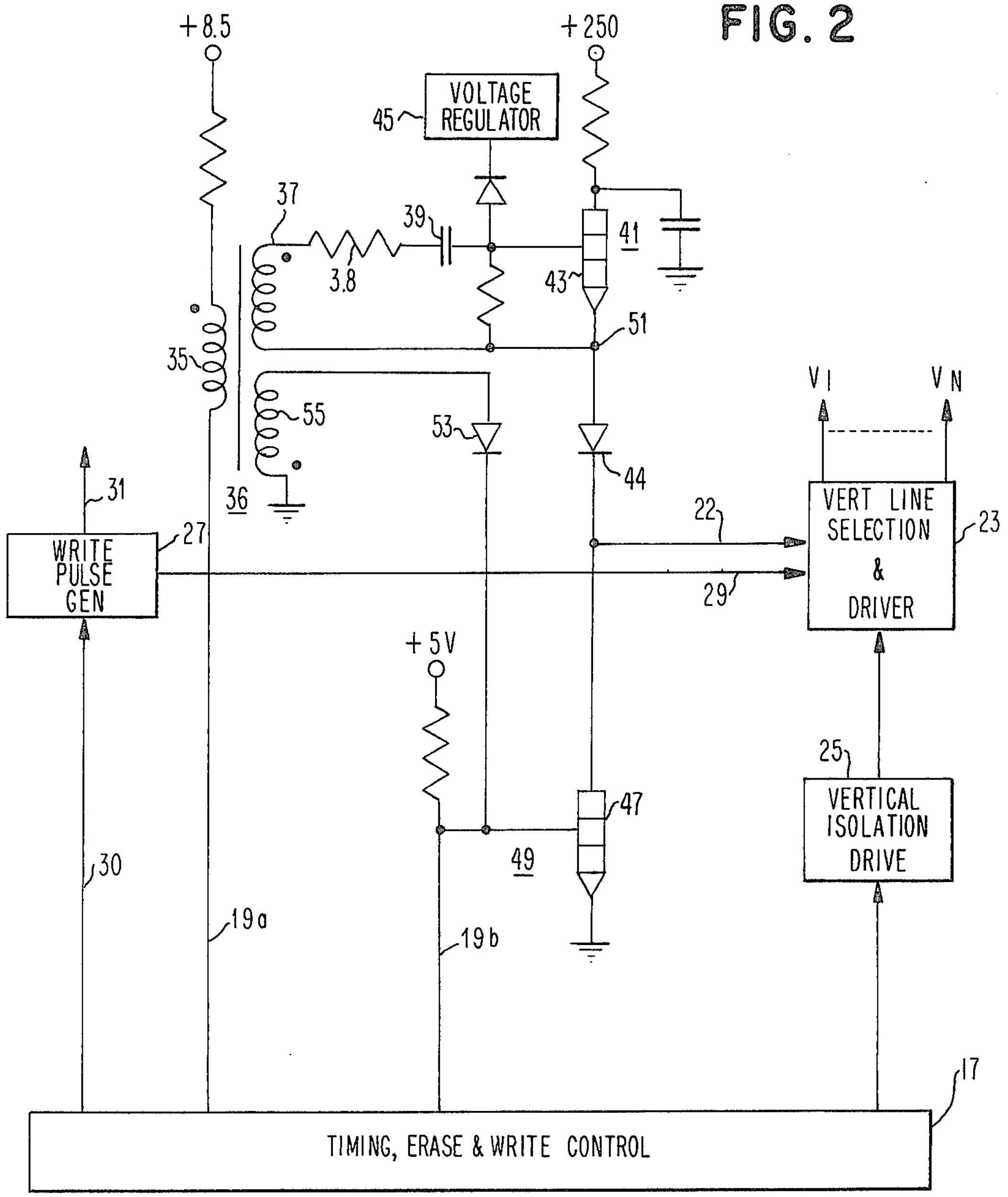
FIG. 3
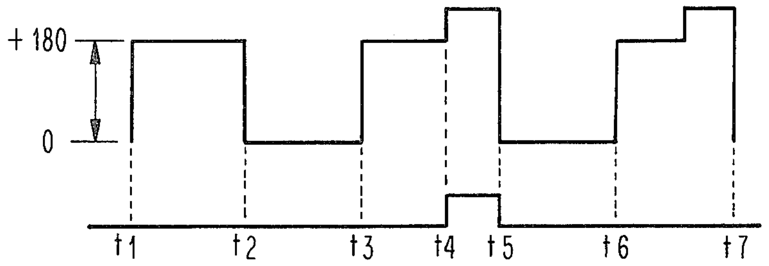
FIG. 3A
FIG. 3B

GAS PANEL SINGLE ENDED DRIVE SYSTEMS

CROSS REFERENCE TO RELATED APPLICATIONS

Application Ser. No. 372,384 "Method and Apparatus for Gas Display Panel" filed by T. N. Criscimagna et al June 21, 1973.

Application Ser. No. 432,279 "Floating Addressing System for Gas Panel" filed by T. N. Criscimagna et al Jan. 10, 1974, now U.S. Pat. No. 3,973,253.

Application Ser. No. 690,755 "Gas Panel Voltage Regulator" filed by James B. Trushell May 27, 1976.

BACKGROUND OF THE INVENTION

In the operation and control of a gaseous discharge display device, a variety of signal levels are employed. Typically, low voltage address control signals originating from logic in a controller or processor are used to control the high level pulse producing means which generates the sustain, write or erase signals for operation of the panel. Since the control and drive signals are at different voltage levels, means must be provided for communication between these signals to effect panel operation. One method of providing such communication is shown in the afore-referenced U.S. Pat. No. 3,973,253 directed to a plasma display system in which the sustain signal is used as a floating reference level, the pulse signal generating means for generating write or erase pulses as well as the selection circuitry and associated power supplies being referenced to the floating sustain signal. Such systems require that the low voltage signal source be isolated from the high voltage pulse generating means, such isolation being generally accomplished by means of pulse transformers, capacitors, etc. Additionally, sustain signals of half or partial amplitude are generally generated on both axes, i.e., a positive potential may be applied to one axis and a negative potential to the opposite whereby the sustain signal across a cell is the algebraic sum of the component voltages. Depending on the type of operation employed, a four level or four buss system such as described in the aforereferenced application Ser. No. 372,384 may be employed in which select and deselect signals will be applied to all conductors to eliminate undesirable results from a half select signal being applied to non-selected conductors. Finally, to effect a write operation requires communication with both axes to generate the write signal across selected cells and during such write operations the sustain signal is terminated, thereby lowering the operating margin for the panel and modifying the intensity of the display which is a function of the sustain frequency.

SUMMARY OF THE INVENTION

In accordance with the present invention, a simplified panel drive system adapted to permit continuous communication between the control signals and drivers during the normal sustain operation while simultaneously affecting economy in control logic and isolation circuitry operates as follows. The conventional gas panel has two sets of conductors on opposite sides of the panel isolated from the gas by a dielectric coating and positioned substantially orthogonal to each other. The present invention utilizes one set of drivers to provide a full sustain signal to one axis while the second set of drivers effectively provides a ground reference to the second axis. A preferred environment for the invention is shown as a single line display in which characters are generated utilizing a 5 × 7 rectangular cell matrix and in which character information is written in the form of character slices after a plurality of cells have been conditioned by one axis of the driver systems. Communication is not evenly divided between the horizontal and vertical axis, and the axis handling most of the communication is designated as the "busy" axis. By maintaining the "busy" axis at ground reference, continuous communication is provided between this axis and the timing and control circuitry, while enough time is available during the normal sustain sequence when the sustain signal is at ground reference to communicate with the drivers utilized with the second axis. By operating in this mode, the isolation circuitry and driver circuitry together with the power associated with the "busy" axis are eliminated, while a uniform intensity display is provided by continuing to operate the panel in the sustain mode. Since the sustain signal is neither interrupted nor modified, the inherent operating margin of the panel is not affected.

Accordingly, a primary object of the present invention is to provide an improved drive system for a gaseous discharge display device for controlling the high voltage pulse producing means with low voltage address control signals.

Another object of the present invention is to provide a single ended drive system for a gaseous discharge display device in which one axis of the display system is maintained at a reference level and a signal of full sustain amplitude is applied to the orthogonal axis to provide increased communication capability between the control device and the device drive circuitry.

The foregoing and other objects, features and advantages of the present invention will be apparent from the following more particular description of a preferred embodiment of the invention as illustrated in the accompanying drawings.

BRIEF DESCRIPTION OF THE DRAWINGS

FIG. 2 is a block schematic diagram of a preferred embodiment of the instant invention illustrating details of the system shown in block form in FIG. 1.

FIG. 3, 3A and 3B illustrates a family of waveforms identifying the sustain, the selected and the unselected write signals utilized in the operation of the present invention.

DESCRIPTION OF A PREFERRED EMBODIMENT

Figure 1:
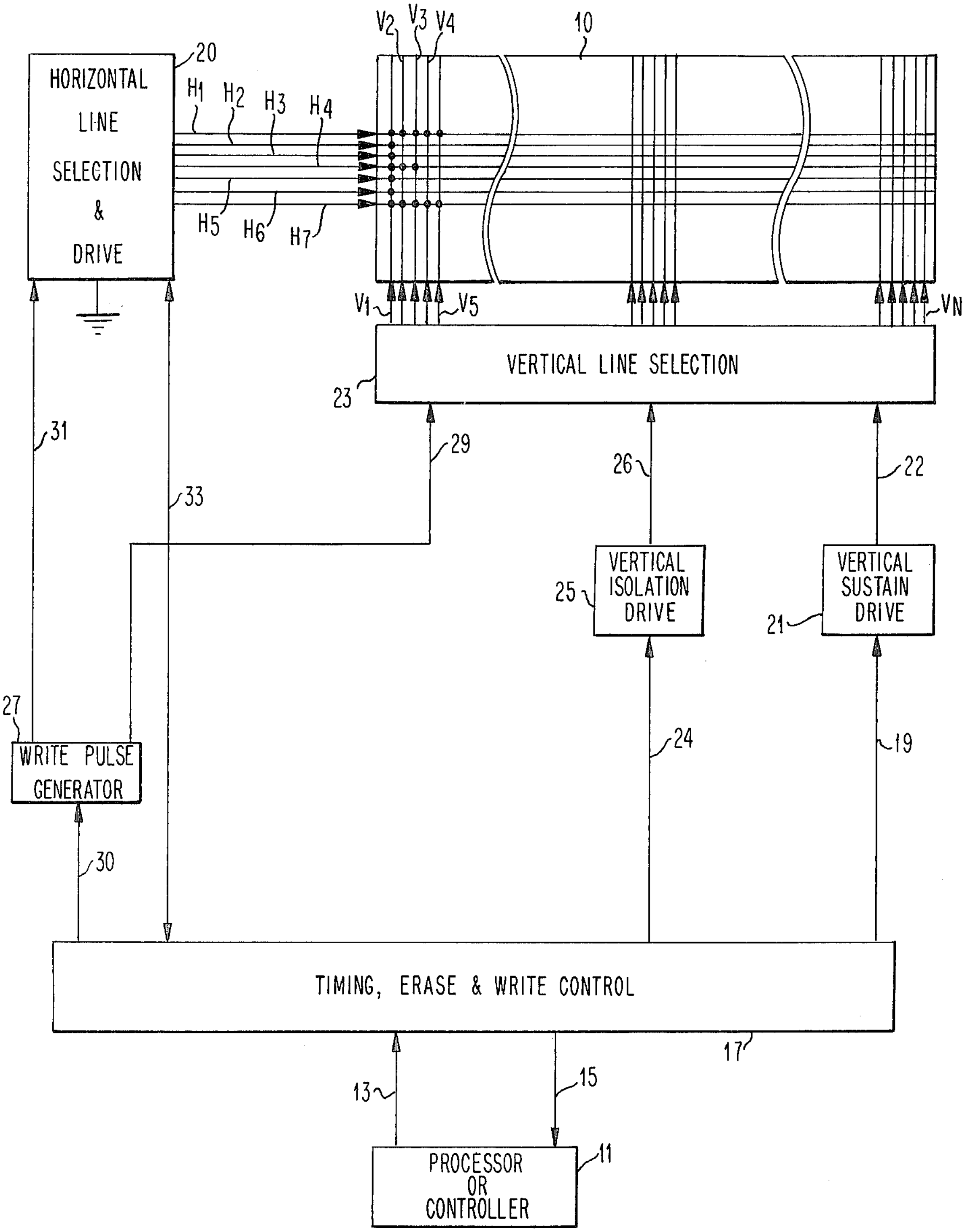
FIG. 1 is a block diagram of a gaseous discharge display system constructed in accordance with the instant invention.

Referring now to the drawings and more particularly to FIG. 1 thereof, the invention is described in terms of a preferred embodiment comprising a single line display in which alphanumeric characters are generated and displayed using a 5 × 7 matrix of cells, although it will be appreciated that the invention is applicable to any size display panel. A gas panel 10 has horizontal lines $H_1$ through $H_7$ disposed on the upper or front plate thereof and vertical lines $V_1$ through $V_n$ on the lower or back plate, and for purposes of description constitutes a 24-character display requiring 120 vertical lines. Such gaseous discharge panels include a gaseous medium under pressure between the plates thereof wherein the conductors are insulated from direct contact with the gas by layers of dielectric and secondary emissive material, the intersection of the horizontal and vertical conductors defining the gas cells. In operation, the dielectric associated with the cell locations is used as a charge storage medium whereby the wall charge of selected cells combines with the sustain signal to maintain a continuous display. The gas cells are selectively ignited, termed a write operation, by applying a potential across selected cells which exceeds the ignition potential of the illuminable gas. Once ionized, each gas cell is maintained in the ionized state until erased by a periodic sustain signal of sufficient amplitude to equal or exceed the sustain level but less than the ignition potential. While such panels require an erase capability which may be provided by applying a high amplitude short duration pulse to the cell or cells to be erased, the present invention is described primarily in terms of sustain and write operations where the maximum benefits of the invention are achieved. By selective writing operations, information may be displayed in the form of characters, symbols, lines and the like on a gas panel 10 and such display data may be regenerated as long as desired.

A processor or controller 11 generates control signals including address signals identifying specific cells or groups of cells to be selected. Processor or controller 11 is connected via conductors 13 to Timing, Erase and Write Control 17, while signals from the block 17 to the processor are applied via line 15. Gaseous discharge display devices have three modes of operation, write, erase and sustain. Write operations are produced by applying a signal across the cell of sufficient amplitude to ionize the gas within the cell, and are generally selective for normal operation. The light emitted upon discharge is maintained by a sustain signal which combines with the wall charge to produce continuous discharges at the sustain frequency. The sustain operation is normally non-selective, is applied to all cells continuously during operation and represents the normal mode of operation of the device. Sustain signals are applied from horizontal lines selection and drive circuit 20 and from the vertical sustain driver 21 through the vertical line selection and drive 23. Sustain signals are rectangular waveforms of approximately 180 volts amplitude and normally operated at a nominal 30 KC rate to provide and maintain a uniform intensity display.

The horizontal line selection and drive 20 and the vertical line selection and drive 23 may include switches or latches for selective operation during a write or erase mode. The operation of the preferred embodiment herein described is in terms of a vertical slice whereby horizontal lines $H_1$ through $H_7$ condition the selected cells, while the vertical lines selection and drive applies write signals to the vertical lines, normally in a sequence from $V_1$ through $V_n$. In the more conventional gas panel operation, as more fully described in the referenced U.S. Pat. No. 3,973,253, the horizontal and vertical drive systems apply signals of opposite polarity but of half the sustain amplitude to the respective conductors $H_1$ through $H_7$ and $V_1$ through $V_n$ whereby the effective signal across a cell is the algebraic sum of the component signals. This requires duplication of sustain generators, and additionally required isolation circuitry associated with each of the drive systems to permit communication between the low level control signals from the processor or controller 11 in an order of magnitude of 5 volts and the high voltage sustain pulses of 90 volts amplitude generated by the horizontal and vertical sustain circuitry, assuming a sustain amplitude of 180 volts. The 30 KC operational frequency of such systems does not afford adequate time for communication between sustain iterations, since communication must be provided between the control signals and horizontal and the vertical drive systems during a selective write or erase operation. Thus the sustain operation is normally terminated during the write or erase interval to permit communication between the control and drive circuitry. In the instant invention, the horizontal line selection and drive 20 is referenced to ground, so that a ground potential is applied to all the lines during the normal sustain interval. The vertical line selection and drive 23 then causes a signal of full sustain amplitude, which may comprise 180 volts, to be applied to the vertical conductors $V_1$ -$V_n$. For a write operation, a write pulse from write pulse generator 27 is selectively applied via line 29 to the vertical line selection and drive circuit 23 where it is added to the sustain signal generated by the vertical line selection and drive 23 to provide a full write signal to selected cells. In the instant invention, a write pulse of 50 volts amplitude is utilized. The write pulse generator 27 is also connected through conductor 31 to the horizontal line selection and drive 20, since the write pulse is also applied to the unselected lines $H_1$ through $H_7$ during each vertical slice to prevent the unselected lines from being discharged during a write operation. For example, to generate the character "E" as shown in FIG. 1 on a 5 × 7 matrix on panel 10, at $V_1$ time all seven horizontal lines $H_1$ through $H_7$ will all be at ground potential, while a signal of full write amplitude is applied to vertical conductor $V_1$. At $V_2$ and $V_3$ times, only lines $H_1$, $H_4$ and $H_7$ will be selected, so that these lines will have a ground potential applied thereto, while non-selected lines $H_2$, $H_3$, $H_5$ and $H_6$ will have a pulse equal in amplitude to the write pulse applied thereto, thereby maintaining the potential across these unselected cells at the sustain level. At $V_4$ and $V_5$ time, lines $H_1$ and $H_7$ will have a ground potential applied thereto, while non-selected lines $H_2$, $H_3$, $H_4$ $H_5$, $H_6$ will have a signal of write pulse amplitude applied to maintain the potential across these cells below the firing level, i.e., at the sustain level. Thus the switches or latches in the horizontal line selection and drive 20 will be closed during a write operation for those lines in which it is desired to fire the cell, while a write pulse will be applied during a write operation to the unselected cells from write pulse generator 27.

During the normal sustain operation, all horizontal latches will be closed so that a ground reference signal is simultaneously applied to all seven horizontal lines, while the full sustain potential is applied to all the vertical lines either sequentially or simultaneously. Since the horizontal line selection and drive 20 handles a byte of information while only a signal vertical line is driven during a write operation, the horizontal line is designated the "busy" axis, while the vertical line is the "axis". However, it should be appreciated that the described embodiment represents only one method of operation, and that information could be written in horizontal lines or bytes in which case the busy and non-busy axes would reverse. By maintaining the busy axis at ground potential, communication between the processor or controller 11 and the horizontal selection and drive 20 is always available via line 33, while the line portion of the sustain signal would be used for communication between the vertical line selection and drive and the processor through vertical isolation drivers 25. Additional details relating to specific circuits which may be used for the selection circuits, erase and write control circuits, isolation drivers and write pulse generator are shown in the aforereferenced U.S. Pat. No. 3,973,253, while the vertical sustain driver 21 may represent a square wave generator operated at a 30 KC rate which is fully described and shown with respect to FIG. 2. Alternatively, rather than a single vertical driver being selectively applied to vertical lines $V_1$ through $V_n$, individual driver circuits could be provided for the vertical axis and the horizontal axis. By means of the above-described system, the circuitry required to float the horizontal line selection and write pulses on the sustain level is eliminated as well as the isolation circuitry required to communicate between the low level signals from the processor or controller and the high level signals generators used to generate the horizontal sustain and/or write signals.

Referring now to FIG. 2, there is illustrated circuit means for generating the sustain and erase waveforms shown in block form in FIG. 1. The vertical sustain driver 21 shown in block form in FIG. 1 generates, as described above, the full sustain signal (180 volts), while the horizontal sustain driver applies a signal at ground level to all horizontal lines during the sustain operation. To communicate between the horizontal line selection and drive circuit 20 and the timing erase and write control 17, the horizontal line selection and drive 20 is referenced to ground level as are the control and logic signals. For a sustain operation, a negative control pulse from control circuitry 17 is applied via line 19*a* to the primary winding 35 of transformer 36, resulting in a positive signal on line 37 of the secondary winding of transformer 36. The signal on line 37 is applied through resistor 38 and capacitor 39 to the base of transistor 41 to turn transistor 41 on, thereby producing a positive signal from the emitter 43. This signal is then applied through diode 44 and line 22 to the vertical line selection and drive circuit 23. When transistor 41 is turned on, the output signal from emitter 43 goes from ground to a level of +180 volts under control of voltage regulator 45. Details of the voltage regulator operation are described in the referenced copending application Ser. No. 690,755. A second control signal is applied via line 19*a* and the aforedescribed path to ensure the transistor 41 remains on and that the signal at the emitter 43 remains at the 180 volt level during the entire half cycle. The resultant sustain signal is then applied via line 22 to the vertical line selection and drive 23, which causes the sustain signal to be applied simultaneously to all vertical lines $V_1$ through $V_n$. To terminate the positive portion of the sustain signal, a positive control signal is applied from the timing, erase and write control 17 via line 19*b* to the base 47 to turn transistor 49 on, thereby closing the circuit between terminal 51 and ground and pulling the sustain signal on line 22 down to ground level. Diode 53 ensures that the control signal developed in transformer winding 55 is not reflected back into the timing, erase and write control circuitry 17. During the sustain operation, the horizontal drive lines $H_1$ through $H_7$ are maintained at a ground reference level as described heretofore with respect to FIG. 1.

In a write operation, a write pulse of 50 volts amplitude is selectively added to the sustain signal during the trailing portion of the sustain to prevent the avalanche effects of the initial sustain from producing an erratic write operation. The display panel system herein described could be considered as a 4-buss system in which the horizontal buss for selected lines $H_1 - H_7$ is maintained at ground potential but for non-selected horizontal lines $H_1 - H_7$ are at a +50 volt level. The vertical busses are either at the normal +180 volt sustain level or 230 volts for a write operation. Since the system herein described applies a full write pulse to the selected vertical cells, means must be provided to prevent the unselected cells in the same line from being turned on. In the instant invention, this is accomplished by applying a corresponding pulse to the non-selected horizontal lines such that the algebraic sum potential across the non-selected cells remains at the sustain level or approximately 180 volts in the embodiment herein described during the write operation. The output from write pusle generator 27 shown as line 31 is applied under control of timing circuit 17 to the horizontal line section and drive circuit 20 (FIG. 1) to cause the 50 volt pulse to be applied to the non-selected horizontal lines $H_1 - H_7$. A corresponding signal is also applied via line 29 to the vertical selection and drive circuits 23, where it is added to the sustain level in the manner shown in FIG. 3. The vertical isolation drive block 25 includes selection logic which selects which of the vertical lines $V_1 - V_n$ receive the write pulse in accordance with the control from the time erase and write control circuitry 17. For a more detailed description of a 4-buss control system, reference is made to the aforenoted Criscimagna et al Application Ser. No. 372,384 or U.S. Pat. No. 3,973,253. Erasing could be accomplished selectively or non-selectively by various techniques such as frequency or amplitude variation, one example being shown in the aforenoted U.S. Pat. No. 3,973,253.

Referring briefly to FIG. 3, there is illustrated therein the horizontal and vertical waveforms associated with a sustain and a write cycle to illustrate the operation of the instant invention. Referring to FIG. 3A, during the normal sustain operation, the rectangular waveforms between 180 volts and ground are applied to the vertical lines, while a continuous ground signal will be applied to the horizontal lines $V_1 - V_n$ such as shown between times *t*1 and *t*2. A complete sustain cycle is shown between *t*1 and *t*3. To generate a non-select write signal, a write pulse of approximately 50 volts is added to the sustain using the sustain as a floating reference in the selected vertical conductors, while a corresponding pulse of 50 volts amplitude is applied to the non-selected horizontal conductors as shown at times *t*4 - *t*5 to maintain the potential across the non-selected cells remains at the sustain level or 180 volts. The write signal applied to selected vertical conductors is shown between times *t*6 and *t*7 during which interval the selected horizontal lines are maintained at ground potential.

The instant invention above described provides an economical drive for a gaseous discharge display system in that the sustain generator, isolation circuits and logic associated with the horizontal axis is eliminated. Maintaining the busy axis at ground potential permits constant communication with the busy axis, while the half cycle of sustain at ground potential affords adequate time to communicate between the vertical axis and the processor or controller so that the sustain signal is neither terminated nor varied.

While the invention has been particularly shown and described with reference to a preferred embodiment thereof, it will be understood by those skilled in the art that other changes in form and detail may be made therein without departing from the spirit and scope of the invention.

What is claimed is:

1. A gas discharge display storage system adapted for low level logic control of a high level driving system during the normal sustain sequence of said system comprising in combination, a gas panel comprising an envelope filled with an illuminable gas, first and second sets of dielectrically coated coordinate conductors positioned in orthogonal relationship on opposite sides of said envelope, the intersections of said conductors defining gas cells in the region of each of said coordinate intersections, a sustain generator associated with each of said sets of coordinate conductors, said sustain generator comprising means for applying a continuous reference signal to one of said sets of coordinate conductors, the level of said reference signal corresponding to that of the associated logic circuits to permit continuous communication between said coordinate conductor set and said logic circuits, said sustain generator further including means for generating high level pulse signals of full sustain amplitude from said reference level for application to the other of said coordinate conductors, communication between said other of said coordinate conductors and said control logic being provided during the interval between said high level pulses, the algebraic sum of said level and pulse signal effecting discharge of said previously selected cells.

2. A gas discharge display storage system of the type claimed in claim 1 further adapted for a write operation, said system including a write pulse generator, and means for algebraically adding said write pulse to said sustain signal of selected cells to effect discharge of said selected cells.

3. Apparatus of the type claimed in claim 2 wherein said write pulse is also added to said reference level sustain signal of non-selected cells to prevent discharge of said non-selected cells.

4. A system of the type claimed in claim 3 further adapted for data slice writing, said system including means for conditioning multiple related cells with said continuous level signal and means for effecting simultaneous discharge of said multiple related cells in said data slice by applying said high level pulse signals of full sustain amplitude to said multiple related cells.

5. A system for controlling the operation of the drive system of a gas panel from low level address and control logic comprising in combination, a gas panel comprising a container filled with an illuminable gas, a first set of coordinate conductors disposed on one side of said panel and a second set of coordinate conductors substantially orthogonal to said first set of conductors disposed on the other side of said panel, the intersecting regions of said conductors defining the location of gas cells in said panel, a first drive system connected to said first set of conductors, said drive system being referenced to ground potential, a second drive system connected to said second set of conductors for generating rectangular signals of full sustain amplitude from said ground reference at a predetermined frequency, and isolation circuit means connected between said second drive system and said control logic, said first drive system being at the same reference level as said control logic and thus adapted for constant communication therewith, said second drive system being adapted to communicate with said control logic during the down portion of said sustain signal.

6. A system adapted to improve communications between the high voltage drive circuits and low voltage control logic of a gaseous discharge display/memory system without interrupting the normal operation of said system comprising in combination a gaseous discharge display/memory panel comprising an envelope filled with an illuminable gas, said panel having first and second sets of orthogonally related coordinate conductor arrays disposed on opposite sides thereof said first and second coordinate arrays defining gas cells in the region of each coordinate intersection, drive circuitry associated with at least one of said coordinate conductor arrays, means for writing a slice of data on said panel by preconditoining a plurality of cells along said first conductor array, means for generating a signal comprising a sequence of rectangular pulses of full sustain amplitude on said second array of said display at a predetermined frequency, means for generating a write pulse, and means for algebraically combining said full sustain amplitude signal with said write pulse whereby the resultant signal across said cells exceed the ionization or breakdown potential of said cells, said means for the preconditioning of said plurality of cells comprising a reference potential applied to said selected cells and a signal of write pulse magnitude applied to said non-selected cells, said reference potential being at the same level as said control logic and enabled to communicate directly therewith, said second conductor array being at said reference during half of each sustain cycle and thus enabled to communicate directly with said control logic during the down interval of said sustain signal whereby communication between said control logic and said first and second drive systems is provided during the normal sustain operation.

7. In a gas discharge device comprising a pair of support plates having dielectric coated conductor arrays thereon, said conductor arrays being substantially orthogonally related to define gas cells at the intersection thereof, the improvement comprising first circuit means for supplying a fixed reference potential to one of said conductor arrays, second circuit means for supplying periodic sustaining rectangular signals to the other of said conductor arrays at a fixed repetition rate, logic circuit and high voltage pulse producing means connected directly to said first circuit means for supplying a fixed reference potential, means for providing low voltage address and control signals to said first circuit means, isolation circuit means connected between said low voltage address and control means and said second circuit means, the interval between said periodic sustaining signals of said second circuit means being used for communication between said low voltage address control signals, said second circuit means and said logic circuit and high voltage pulse producing means for providing selective manipulation of said gas cells.

* * * * *